H. P. BROWN.
APPARATUS FOR LEVELING THE SURFACE OF PLASTIC WALLS.
APPLICATION FILED APR. 21, 1917.

1,297,082.

Patented Mar. 11, 1919.

Inventor:
Harold P. Brown
By Brown & Duward
his Attorneys

H. P. BROWN.
APPARATUS FOR LEVELING THE SURFACE OF PLASTIC WALLS.
APPLICATION FILED APR. 21, 1917.
1,297,082.
Patented Mar. 11, 1919.
4 SHEETS—SHEET 2.
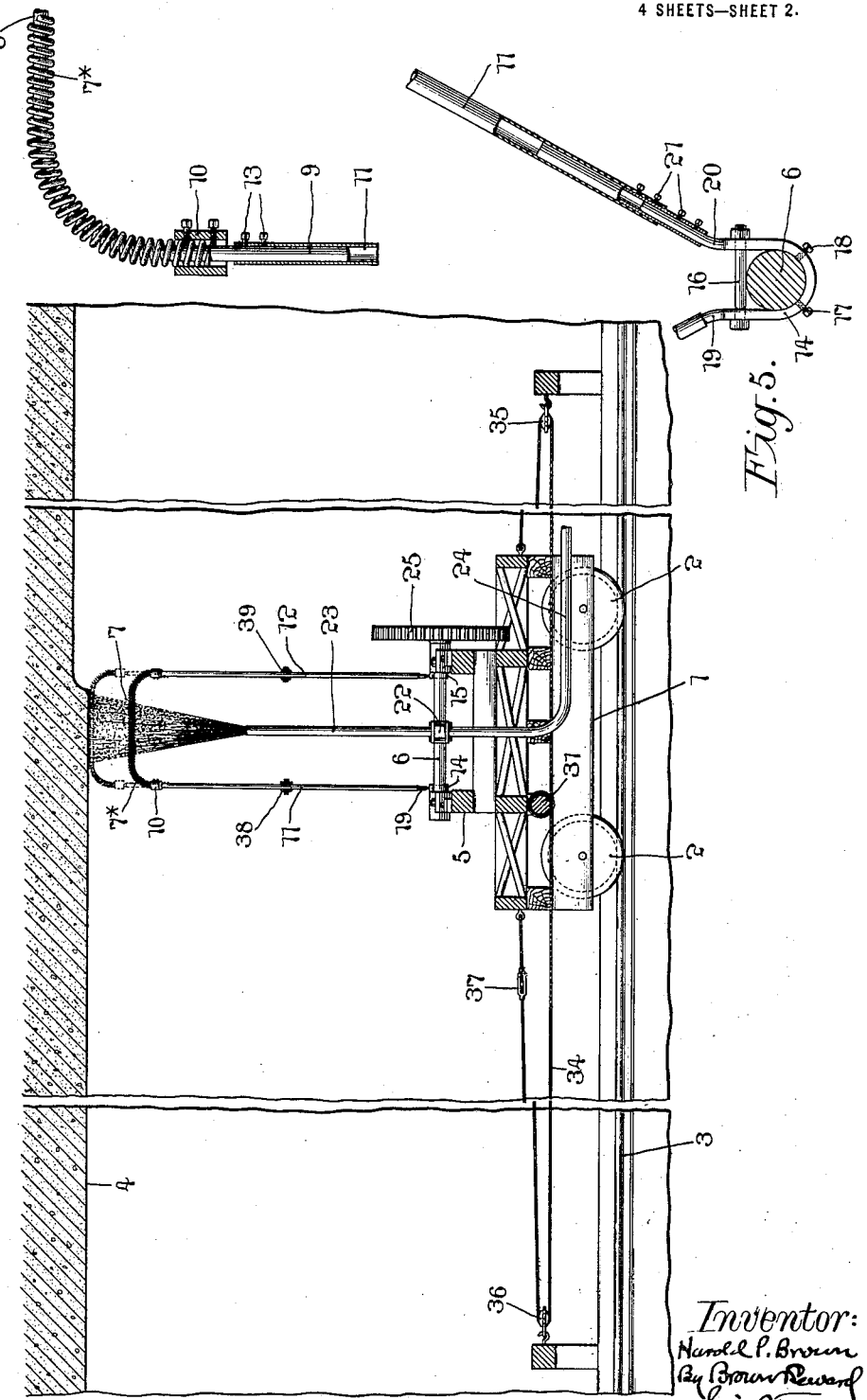

H. P. BROWN.
APPARATUS FOR LEVELING THE SURFACE OF PLASTIC WALLS.
APPLICATION FILED APR. 21, 1917.

1,297,082.

Patented Mar. 11, 1919.
4 SHEETS—SHEET 3.

H. P. BROWN.
APPARATUS FOR LEVELING THE SURFACE OF PLASTIC WALLS.
APPLICATION FILED APR. 21, 1917.
1,297,082.
Patented Mar. 11, 1919.
4 SHEETS—SHEET 4.
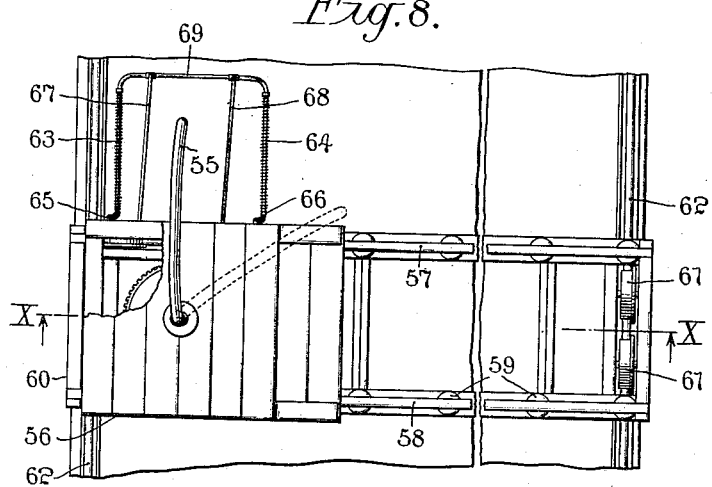
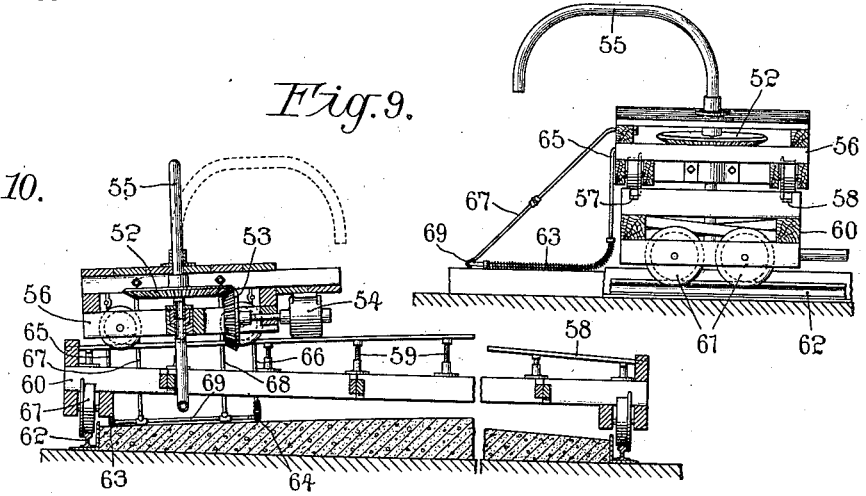
Inventor: Harold P. Brown
By Brown & Seward
his Attorneys

UNITED STATES PATENT OFFICE.

HAROLD P. BROWN, OF NEW YORK, N. Y.

APPARATUS FOR LEVELING THE SURFACE OF PLASTIC WALLS.

1,297,082.   Specification of Letters Patent.   Patented Mar. 11, 1919.

Application filed April 21, 1917. Serial No. 163,612.

*To all whom it may concern:*

Be it known that I, HAROLD P. BROWN, a citizen of the United States, and resident of the borough of Manhattan, in the city and State of New York, have invented a new and useful Improvement in Apparatus for Leveling the Surface of Plastic Walls, of which the following is a specification.

My invention relates to apparatus for leveling the surface of a wall of plastic material and more particularly a concrete wall, with the object in view of providing a dense, durable wall of the desired uniform thickness in a rapid and efficient manner.

In the several structures which have been chosen to illustrate practical embodiments of the invention, the nozzle and conduit connected therewith for directing the plastic material to the surface to which it is to be applied are shown in operative coöperation with the leveling apparatus which will be hereinafter termed a trowel, but if for any reason occasion should arise for applying the plastic material to the surface in any other manner, the trowel might still be used effectively for leveling the surface. In using the word "trowel" in this application, the intent is to include any suitable leveling device adapted to work on the plastic material before the latter becomes "set" or hard.

In the accompanying drawings.

Figure 1:
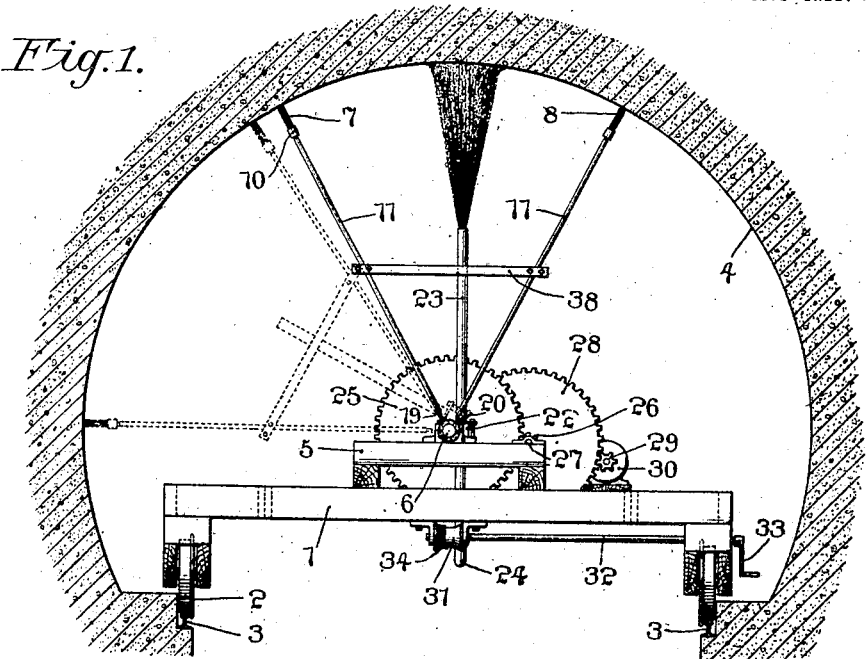
Figure 1 is a view of the apparatus in side elevation.
Figure 2:
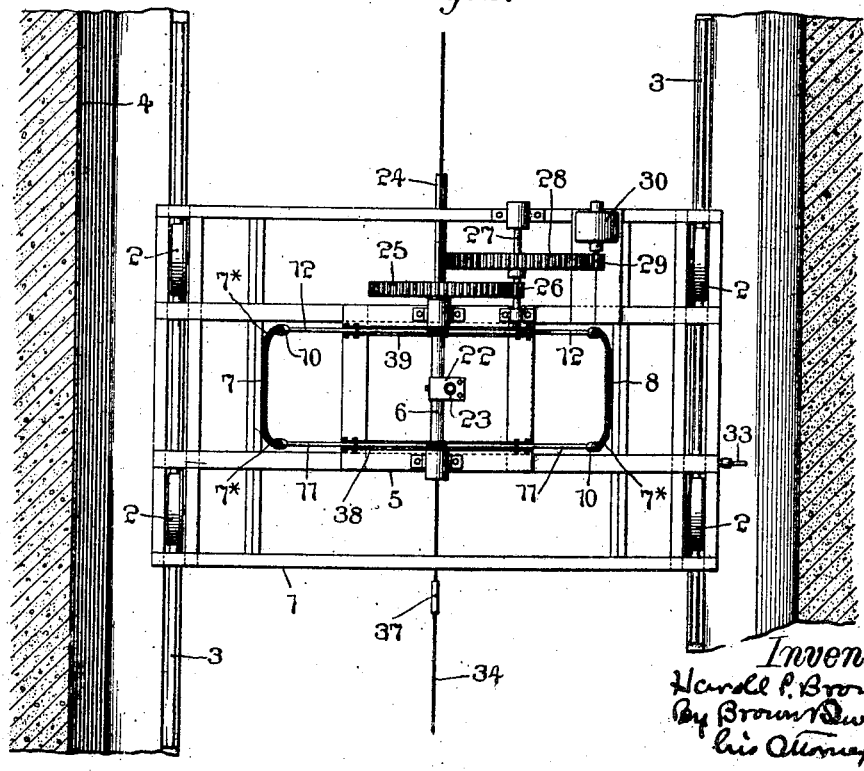
Fig. 2 is a plan view of the same.
Figure 6:
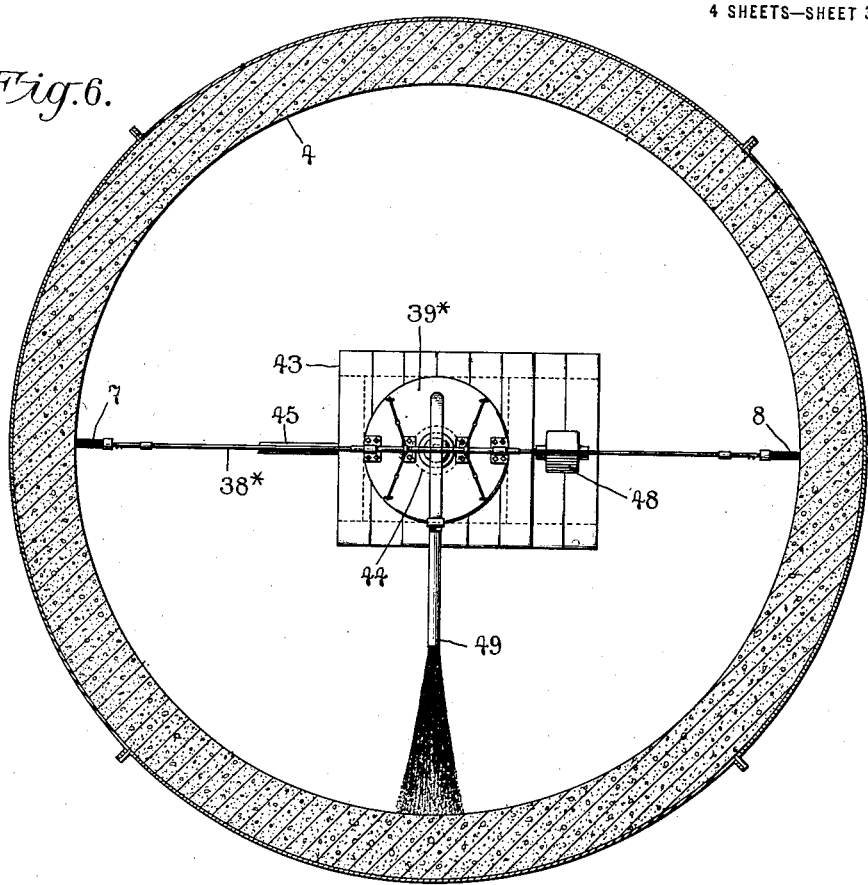
Figure 7:
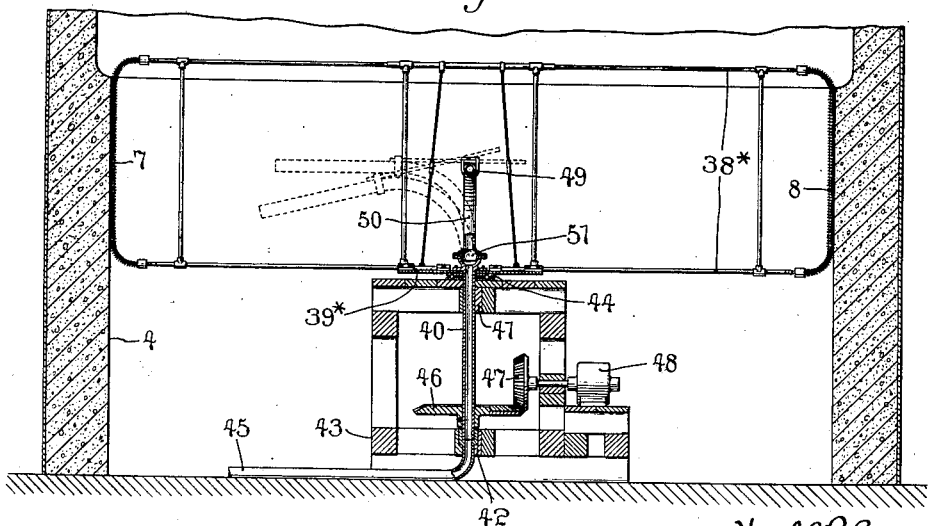

Fig. 3 is a longitudinal central section taken through the apparatus and the tunnel in which it is represented as acting, Fig. 4 is an enlarged partial view of one of the trowels, Fig. 5 is an enlarged detail section of the means for supporting and adjusting a pair of trowels, Fig. 6 is a plan view of a modified form of apparatus suitable for building a vertical tubular structure, Fig. 7 is a vertical central section of the same, Fig. 8 is a plan view of another form of the apparatus suitable for building horizontal structures such as roads, floors, etc.

Fig. 9 is an end elevation of the same, and

Fig. 10 is a vertical central section of the same taken in the plane of the line X—X of Fig. 3.

Referring to the form of apparatus shown in Figs. 1 to 5 inclusive, a platform 1 is mounted on wheels 2 adapted to travel along rails 3 laid longitudinally of a tunnel the wall 4 of which is to be faced with concrete. A superstructure 5 on the platform 1 carries a shaft 6 extending in the longitudinal horizontal direction of the tunnel wall and on this shaft 6, a pair of trowels 7 and 8 are fixed as follows. The trowels proper are quite similar in structure and consist of a spiral wire coil 7* about a straight pipe 8*, see Fig. 4, the wire coil at the opposite ends of the straight pipe 8* gradually curving until having reached an angle of 90° to the pipe 8*, the coil is clamped to a pipe or rod 9 by a clamp 10. The rods or pipes 9, one at each end of the trowel, are adjustably secured in tubular arms 11, 12, in which they telescope, by set screws 13. The tubular arms 11, 12, receive at their opposite ends, one branch each of a pair of yoke pieces or clips 14, 15, each secured to the shaft 6 by a bolt 16 and set screws 17, 18, in such a manner that the clips may be adjusted around the shaft 6 to change the positions of the branches 19, 20, of the clips relative to the shaft 6, as may be desired. The branches 19, 20, are made adjustable in the tubular arms 11, 12, by means of set screws 21, as shown in Fig. 5. The divergence of the arms 11, 12, which carry one trowel, from the corresponding arms which carry a companion trowel, is here shown as 50° more or less, but may be made greater or less as experience may dictate. The freedom of the wire coil 7* at the opposite ends of a trowel makes the trowel yielding to an extent sufficient to allow it to gradually overcome any unusual temporary resistance but not sufficiently yielding to vary materially the general level of the face of the wall.

To the shaft 6 is also clamped a holder 22 for the tubular nozzle 23, connected with the flexible conduit 24 through which the concrete is impelled to be deposited on the wall surface. The nozzle 23 is located about midway of the length of a trowel and is directed toward the tunnel wall about midway between the two trowels.

The shaft 6 has secured thereon a driving gear wheel 25 which in turn is driven by a pinion 26 on the shaft 27 of a gear wheel 28 driven by a pinion 29 on the shaft of a reversible motor 30 of any suitable form, preferably an electric motor.

The platform 1 may be moved along the rails 3 in any convenient manner. It is here shown as provided with a rotary drum 31 operated by a shaft 32 provided with a hand crank 33. A rope 34 made fast at one end to the front of the platform 1, extends thence to a fixed pulley 35, thence to and one or more times around the drum 31, thence to a fixed pulley 36 and thence to the rear end of the platform 1, to which it is made fast. A turnbuckle 37 is provided to keep the tension as desired.

To stiffen the tubular arms of the trowels in the direction in which they are submitted to strain, braces 38, 39, are employed connecting each arm of one trowel with the opposite arm of the other trowel.

In operation, the arms of the trowels having been adjusted to such length that they will traverse an arc, as the shaft 6 rotates, corresponding to the arc which the surface of the concrete wall is desired to have, the application of the concrete takes place, the shaft 6 being driven first in one direction and then in the opposite direction by the motor operator, until the trowels show by their continuous action on the face of the wall that the thickness of deposit required has been reached. The apparatus may then be moved bodily along on the rails 3 a distance corresponding to the width of the band of concrete already deposited and leveled and a succeeding band or segment of a band contiguous to and forming one with the previously deposited band may then be deposited and so on to the end of the work.

In the form shown in Figs. 6 and 7, the trowels 7, 8, are arranged to move in a horizontal plane instead of a vertical plane as in Figs. 1 to 5 inclusive. They are attached to the opposite ends of a skeleton frame 38, the lower edge of which is secured, midway of its length, to a turntable 39, which in turn is fixed to an upright tubular shaft 40 mounted in bearings 41, 42, in a base frame 43. The turntable 39 bears on a plate 44 on the top of the frame 43, and antifriction bearing devices of any well known or approved form may be employed. The tubular shaft 40 swivels in the bearing 42 and forms a continuation of the conduit 45 through which the concrete is impelled. A beveled gear wheel 46 fixed on the shaft 40, is engaged by a bevel gear wheel 47 driven by a motor indicated at 48 and supported on the frame 43. At the upper end of the shaft 40, the nozzle 49 is attached, a curved portion 50 at the base of the nozzle being provided to change the general direction of the nozzle from vertical to horizontal. The base of the nozzle is connected with the shaft 40 by means of a globular joint 51, or any other well known or approved joint which will allow the nozzle to rock up and down to a limited extent, as shown in dotted lines Fig. 7, to apply the concrete throughout the width of a strip or band corresponding to the length of a trowel 7 or 8.

In operation, the concrete applying nozzle together with the trowels may be moved continuously around in either direction until a band equal to the length of a trowel is completed, or, the parts may be reciprocated back and forth to cover the entire cylindrical section. When a cylindrical section or band is completed, the base frame 43 with the operative parts thereon may be jacked up the width of a band and blocked in position to complete a successive band and so on to the required height.

In Figs. 8, 9 and 10, a form of apparatus is shown adapted to the work of road or floor making and in which the trowels and concrete applying nozzle are mounted to reciprocate in either a right or curved line and at the same time be moved bodily along in a direction at an angle to their reciprocatory movements. In this form the gear 52, 53 and motor 54 are arranged to rotate the concrete discharge nozzle 55 back and forth over the strip of road or floor to be laid, while the said gear, motor and nozzle are moved by means of a carriage 56 back and forth across the width of the road or floor to be laid. The carriage 56 is mounted on flexible rails 57, 58, supported on jack screws 59 at such intervals apart that the rails 57, 58, may be given a limited degree of slant or curvature to give the road or floor the desired crown or pitch. The jack screws 59 are supported on a frame 60 mounted on wheels 61 constructed to travel on rails 62 laid lengthwise of the road or floor so that when a transverse section or strip has been completed, the supporting frame 60, which with its wheels constitutes a truck, may be moved along carrying with it the carriage 56 and parts mounted thereon, into position to lay a succeeding strip or section. The trowels are here denoted by 63, 64. They have the same general construction as the trowels 7 and 8 hereinbefore described, their inner ends being supported by upright standards 65, 66, fixed to the carriage 56, and their outer ends by slanting braces 67, 68, which extend from the carriage 56 to a bar 69 connecting the outer ends of the trowels. The trowels 63, 64, reach out from the supporting frame 60, over the strip to be laid and the discharge end of the nozzle 55 rotates back and forth over the space between the trowels to deposit the concrete to be leveled by the trowels as the carriage 56 travels back and forth on the rails 57, 58. The carriage 56 may be moved back and forth on the rails 57, 58, manually or by any suitable application of power as may be desired.

What I claim is:

1. A trowel consisting of a cylindrical spiral wire coil.

2. A trowel consisting of a cylindrical spiral wire coil and a core within the coil.

3. A trowel consisting of a cylindrical spiral wire coil with a core within the coil and curved spiral wire coils forming extensions of the ends of the cylindrical coil.

4. The combination with supporting arms of a trowel consisting of a spiral wire coil connected with the ends of the arms and means for holding the arms in operative position.

5. The combination with extensible and contractible arms, of a trowel connected with the ends of the arms and means for holding the arms in operative position.

6. The combination with extensible and contractible arms, of a trowel consisting of a spiral wire coil connected with the ends of the arms and means for holding the arms in operative position.

7. The combination with a pair of clips having extensions at their ends, of trowels each connected with an extension of each clip and means for holding the clips and hence the trowels in operative position.

In testimony, that I claim the foregoing as my invention, I have signed my name this 16th day of April 1917.

HAROLD P. BROWN.